(12) United States Patent
Hansen et al.

(10) Patent No.: US 12,734,694 B2
(45) Date of Patent: Sep. 15, 2026

(54) METHOD FOR THE SAFE OPERATION OF A MACHINE

(71) Applicant: SICK AG, Waldkirch (DE)

(72) Inventors: Christoph Hansen, Hamburg (DE); Andre Bühler, Freiamt (DE); Thomas Neumann, Schallstadt (DE); Jonas Winter, Nusse (DE)

(73) Assignee: SICK AG, Waldkirch (DE)

( * ) Notice: Subject to any disclaimer, the term of this patent is extended or adjusted under 35 U.S.C. 154(b) by 90 days.

(21) Appl. No.: 18/679,409

(22) Filed: May 30, 2024

(65) Prior Publication Data

US 2024/0399582 A1 Dec. 5, 2024

(51) Int. Cl.
*B25J 9/16* (2006.01)
*B25J 9/00* (2006.01)
*G05B 19/4061* (2006.01)

(52) U.S. Cl.
CPC .......... *B25J 9/1676* (2013.01); *B25J 9/0081* (2013.01); *B25J 9/1694* (2013.01);
(Continued)

(58) Field of Classification Search
CPC ...... B25J 9/1676; B25J 9/0081; B25J 9/1694; B25J 19/06; B25J 9/1674; B25J 9/1664;
(Continued)

(56) References Cited

U.S. PATENT DOCUMENTS 10,558,214 B2 * 2/2020 Jaquez ...................... B25J 9/00
2014/0067121 A1 * 3/2014 Brooks ................. B25J 9/1676 700/255

(Continued)

FOREIGN PATENT DOCUMENTS

DE 102015112656 A1 2/2017
DE 102018113359 A1 12/2019

(Continued)

OTHER PUBLICATIONS

Search Report issued on Nov. 21, 2023, for application No. EP 23176264.2.

*Primary Examiner* — Dylan M Katz
(74) *Attorney, Agent, or Firm* — Nath, Goldberg & Meyer; Jerald L. Meyer

(57) ABSTRACT

A method for the safe operation of a machine, which has a movable machine part comprising a hazardous section, comprises: the movable machine part moving according to a predefined sequence program; and an environment of the hazardous section being monitored, wherein, in the event of an engagement of an object into a defined protective volume, which is dependent on the current position of the hazardous section, within the monitored environment, a safety-related reaction is triggered that comprises the movement of the movable machine part being stopped if the engagement exceeds a defined engagement threshold of the protective volume. For a teaching-in of the protective volume, it is provided: that an initial protective volume is first predefined; that the machine is controlled so that the movable machine part moves according to the predefined sequence program while the environment of the hazardous section is monitored; that, if the movement of the movable machine part is stopped as a result of an object engaging into initial protective volume, a teach-in mode can be started by means of a first user input, in which teach-in mode the movement is continued and position data of objects in the environment of the hazardous section are acquired in so doing; that the teach-in mode can be terminated by means of a second user input; and that the protective volume is defined based on the acquired position data.

21 Claims, 2 Drawing Sheets

(52) U.S. Cl.
CPC .................... *G05B 19/4061* (2013.01); *G05B 2219/40202* (2013.01); *G05B 2219/40203* (2013.01)

(58) Field of Classification Search
CPC ....... B25J 13/08; B25J 19/02; G05B 19/4061; G05B 2219/40202; G05B 2219/40203; G05B 2219/40584
See application file for complete search history.

(56) References Cited

U.S. PATENT DOCUMENTS

| | | | | |
|---|---|---|---|---|
| 2019/0270199 | A1 | 9/2019 | Ning et al. | |
| 2019/0291275 | A1* | 9/2019 | Szarski | B25J 9/1671 |
| 2023/0191635 | A1* | 6/2023 | Vu | F16P 3/144<br>700/259 |

FOREIGN PATENT DOCUMENTS

| | | | | |
|---|---|---|---|---|
| DE | 102018113362 | A1 | 12/2019 | |
| DE | 102019102833 | A1 | 8/2020 | |
| DE | 102019110882 | A1 | 10/2020 | |
| EP | 3699634 | A1 | 8/2020 | |
| EP | 3744482 | A1 | 12/2020 | |
| EP | 3875228 | A1 | 9/2021 | |
| EP | 3988256 | A1 * | 4/2022 | F16P 3/142 |
| EP | 4124789 | A1 | 2/2023 | |

* cited by examiner

METHOD FOR THE SAFE OPERATION OF A MACHINE

The invention relates to a method for the safe operation of a machine, in particular as part of a human-robot collaboration, wherein the machine has a movable machine part comprising a hazardous section, i.e. a section from which or from whose structure a particular hazard for a human working together with the machine can generally emanate.

Robots or comparable machines are above all used in industrial environments to perform certain tasks. This in particular relates to tasks during which particularly large forces have to be exerted and/or which have to be performed at a high speed and with a high precision, in particular if the respective task very often has to be performed in the same way. However, there are also tasks that can be performed better by a human than by a machine. This in particular relates to tasks that are difficult to automate, for instance because they require experience and/or a high degree of adaptability. In processes that involve both work of the one kind and work of the other kind, it can therefore be expedient if humans and machines work together to combine their respective strengths as efficiently as possible.

The nature of the cooperation can be different in this respect. For example, the working zones of a robot and a human can merely overlap, wherein no direct interaction between the robot and the human takes place, or wherein an interaction is only provided when the robot is stationary. Such a form of cooperation is also designated as human-robot cooperation. However, the cooperation can also go so far that a direct interaction up to a scheduled contact between a human and a robot takes place, for instance when the human and the robot simultaneously work on one workpiece or the robot is hand-guided. This kind of cooperation is also called human-robot collaboration. With respect to the present invention, human-robot collaboration is to be understood in a rather broad sense and can comprise all the mentioned forms of the cooperation, i.e. also human-robot co-operations.

Due to a human-robot collaboration, high demands result with respect to the safety of the people involved since the machines involved can in particular pose a danger to the people due to their power and speed. Precautions must therefore be taken to prevent personal injury wherever possible. Such precautions include both passive measures, such as avoiding hard or sharp edges at outer sides of the machine and rather providing soft and/or rounded surfaces, and active safety mechanisms that trigger a specific safety-related reaction in the event of a danger to a person in order to avert this danger. For example, a tool (for example, a gripper or a dispenser) that serves to process a workpiece can be provided at a free end of a robot arm, wherein the tool tip must be configured to fulfill its function in a way that may be dangerous for a person working together with the machine, for example since a person can injure himself at the tool. In order nevertheless to rule out an endangerment as far as possible in such a case, it may, for instance, be expedient to ensure that the tool can only ever be operated at a certain safety distance from persons present.

If, as part of a human-robot collaboration, robots or comparable machines, such as AGVs (Automated Guided Vehicles), AGCs (Automated Guided Containers) or drones work together with people in a defined working environment without being permanently spatially separated from one another by a separation apparatus, a danger to a person involved in the collaboration can in particular arise if a collision occurs between the machine and the person. This danger can be countered in various ways.

One possibility is that the machine is only operated under the direct control of a human who can thus ensure that neither he nor other persons are endangered by the machine. However, if the control of the machine takes place automatically or the machine even works autonomously, the safety of the persons working together with the machine can be ensured according to a further safety concept by limiting the movements of the machine, in particular its force and speed, such that it is highly unlikely to cause pain or injury to the respective person in the event of a collision. However, such a safety concept based on limiting the machine is only possible if the work for which the machine is used does not require high forces or speeds. Furthermore, there may be sections of the machine that pose a hazard even at low forces and speeds, for example because they are pointed, sharp or hot.

According to an alternative safety concept, the aim is to prevent a collision between a person and the machine in the first place. For this purpose, it is ensured that the machine can only be put into operation at all if there is no human in a defined environment of the machine or at least of a respective hazardous section of the machine, and that the machine is immediately as slowed down or stopped soon as a human enters the defined environment. The environment can in particular be defined by a safety distance from the machine or a tool of the machine and can be static or, if the environment is defined relative to a moving element of the machine, also dynamic. The environment is constantly monitored in this respect so that the presence of a human in the environment can immediately be reacted to with a suitable safety measure.

The technology used for such safety concepts must work in a particularly reliable manner and must therefore meet high security requirements. For example, it may be necessary for sensors used to comply with the standards EN ISO 13849-1:2015 and EN ISO 13849-2:2012 for machine safety and the device standards EN IEC 61496-1:2020 and EN IEC 61496-2:2020 for electro-sensitive protective equipment (ESPE). For this purpose, a series of measures must be taken such as a secure electronic evaluation by redundant, diverse electronics and a functional monitoring or a monitoring of the contamination of optical components.

For example, at the distal end of a robot arm at which a tool or a tool mount for a tool can be provided and from which a danger for a person working together with the robot arm can generally emanate, a safety device can be provided that protects against the risk emanating from this hazardous section of the robot arm by monitoring a protective volume enveloping the hazardous section. The protective volume can be realized by means of a plurality sensors by which it can be determined whether the protective volume is free or not. If an engagement into the protective volume is detected, it is possible to react thereto in a safety-oriented manner, in particular by slowing down or stopping the movement of the robot arm.

To reliably recognize an event that must be reacted to in a safety-related manner, it is important to define the way in which the protective volume is defined or the way in which it is defined what is considered to be an engagement into the protective volume. Typically, before the actual operation of the machine, reference data are taught, based on which the protective volume is then defined in advance. Particular consideration must be given to sections of the work sequence of the machine in which an approach of a monitored hazardous section of the machine to one or more objects is provided as scheduled so that this approach does not lead to a safety-related reaction as a result of these objects engaging into the protective volume.

The teaching-in of the reference data typically takes place during the configuration of a sequence program for the respective machine. For example, such a configuration can take place based on templates that represent different work steps of the machine (e.g. moving, turning, searching, gripping, etc.) and can be parameterized as function blocks and linked together to form a sequence in order to create a sequence program for the machine. A protective volume can generally be defined and monitored independently of the sequence program for a respective hazardous section of the machine. However, if the sequence program includes sections whose execution would trigger a safety-related reaction, the protective volume must be adapted to the respective sequence program.

For such an adaptation, a special dedicated template could, for instance, be provided that can be integrated into the sequence program to provide a safeguarded waypoint that ensures that the reference data required for the adaptation are taught along a defined approach movement together with the coordinates of the waypoint. In this way, before the actual normal operation of the machine, in which the machine performs the tasks in accordance with the sequence program, a kind of calibration can be performed to teach-in the reference data required for adapting the protective volume.

However, this requires a specific implementation of said dedicated template within the ecosystem of the respective robot or the respective machine. Furthermore, separate training is usually required for using the special template for the user involved in the configuration. Overall, such a teaching-in of a protective volume adapted to the respective sequence program is therefore quite complex. Furthermore, the movement sequences that can be taught in this way are limited to what can be created using the special template (or using a fundamentally restrictive range of templates).

It is an object of the invention to provide a method for the safe operation of a machine that has a movable machine part comprising a hazardous section, and to provide such a machine that can be operated according to the method, wherein the method offers a particularly simple operability, in particular with respect to an initial teaching-in, preferably also with respect to a repeated adaptation, of a protective volume within a monitored environment of the hazardous section, and in this respect simultaneously enables a particularly flexible creation of user- and application-specific movement sequences.

This object is achieved by a method having the features of claim 1 and by a machine having the features of claim 13. Advantageous embodiments of the invention result from the dependent claims, from the present description, and from the Figures.

The method according to the invention serves for the safe operation of a machine that has a movable machine part comprising a hazardous section, in particular for a safe operation as part of a human-robot collaboration. The movable machine part can be a robot arm, for example. The hazardous section can generally be any section of the movable machine part for which it is intended to ensure that a person working together with the machine is protected therefrom. In this regard, such a section that, for instance due to its structure or function, poses a risk to the person can be considered a hazardous section. The hazardous section can in particular be the distal end (that is free and that is opposite a fixed end) of a robot arm, a tool mount provided at this end or at another position of the respective machine, or a tool received in the tool mount or formed as part of the machine. In this respect, the machine can also have a plurality of (similar or different) hazardous sections.

According to the invention, the method comprises: the movable machine part moving according to a sequence program predefined for the machine; and an environment of the hazardous section being monitored, wherein, in the event of an engagement of an object into a defined protective volume within the monitored environment, a safety-related reaction is triggered. The safety-related reaction in this respect comprises (possibly among other things) the movement of the movable machine part being stopped if the engagement exceeds a defined engagement threshold of the protective volume. These method steps are part of a kind of normal operation of the machine. In this regard, the method comprises the (normal) operation of the machine, wherein the operation comprises said method steps.

In the course of the (normal) operation of the machine, the machine can be controlled, for example by a control apparatus integrated into the machine or external to the machine, so that the movable machine part moves according to the predefined sequence program. The sequence program can, for example, be predefined for the machine by parameterizing and linking various function templates to form a sequence. Parameters such as movement paths, speeds of movements and work steps at various points of the sequence can be defined by the sequence program.

Due to the movement of the movable machine part, the hazardous section of the movable machine part traverses a movement path corresponding to the sequence program. In this respect, not only the point in time within the sequence at which the hazardous section should be at which point in space, but also the orientation it should have can be defined by the sequence program. For automation tasks, the sequence program expediently comprises at least parts of the sequence program being repeatedly executed so that the hazardous section repeatedly traverses its movement path.

While the movable machine part moves and the hazardous section thus does not traverse a movement path, the hazardous section is safeguarded during the (normal) operation of the machine by monitoring the environment of the hazardous section. The environment is in this respect to be understood relative to the hazardous section, i.e. moves along with it. The monitoring can in particular take place by means of one or more sensors, in particular distance sensors. The environment of the hazardous section is in this respect not necessarily fixed to a fixed spatial extent relative to the hazardous section, but can be limited by the detection range of the sensors used, for example, can correspond to the measurement range that can be detected by the sensors used. However, the monitored environment of the hazardous section can also be restricted, for instance, to reduce a computing effort for the evaluation of the data acquired by the sensors.

The fact that the environment of the hazardous section is monitored does not necessarily mean that a reaction takes place in response to every detected event in the monitored environment. Rather, reactions can be limited to being triggered only if a relevant event is detected in a protective volume that is defined within the monitored environment and that can therefore be smaller than the monitored environment. Specifically, during the (normal) operation of the machine, the safety-related reaction is triggered at least in the event of an object engaging into the defined protective volume (i.e. if it is determined by monitoring the environment detects that an object engages into the defined protective volume). The engagement into the protective volume does not necessarily have to take place by a movement of the respective object, but is to be understood relatively so that a movement of the movable machine part with the hazardous section towards a possibly static object can also lead to the object engaging into the protective volume.

The object can generally be any object that could interfere with the movement of the movable machine part or could be endangered by the movement of the movable machine part, in particular the hazardous section. At least all the objects should generally be detected whose engagement into the protective volume is not provided as part of the activity to be performed by the machine according to the sequence program. This in particular includes hands or other body parts of a person working together with the machine to protect them from being endangered by the hazardous section. In this respect, it is conceivable that, as part of the monitoring of the environment, it is also detected whether a respective object engaging into the protective volume is a human (or a living being in general) or an object, wherein the safety-related reaction can then depend on the type of object detected. However, such a distinction is not absolutely necessary.

The protective volume is expediently defined relative to the hazardous section so that it moves along with it. The protective volume preferably envelops or surrounds the hazardous section such that an object (at least an object of a certain size, such as a body part) cannot come into contact with the hazardous section without previously engaging into the protective volume. For this purpose, the hazardous section does not necessarily have to be contained in the protective volume itself. For the protective volume can also be designed merely as a kind of protective jacket that surrounds the hazardous section, i.e. bounds an inner space in which the hazardous section is located, for example in the manner of a lampshade that surrounds the respective light source.

The shape and dimensions of the protective volume can in particular result from the detection volume (measurement range) of one or more sensors used for the monitoring, and thus in particular from the number, arrangement and orientation of the sensors. In this respect, additional limits can also be defined. For example, the protective volume, in particular if the sensors are distance sensors, can be limited to a maximum (and/or minimum) distance from the sensors (from all the sensors or from at least a respective one of the sensors). In this regard, an engagement into the protective volume can correspond to a falling below of a certain distance threshold.

The safety-related reaction is a reaction to an external event (engagement into the protective volume) and is therefore not part of the sequence program. Rather, the monitoring of the environment of the hazardous section and the possibly triggered safety-related reaction take place independently of the sequence program, virtually as a background process, wherein the safety-related reaction can intervene in the sequence program, however. Preferably, the implementation of the sequence program is, however, not modified by the safety-related reaction, but only slowed down or interrupted and ideally ultimately continued again (without changing the predefined sequence).

The safety-related reaction can comprise a whole bundle of measures that are not necessarily triggered simultaneously, but for which different trigger conditions can be defined. Various individual reactions can in particular be summarized under the generic term of the safety-related reaction, of which a respective one is triggered depending on how critical the engagement of a respective object into the protective volume is. This makes it possible to react to an engagement into the protective volume in a graduated manner, for example by initially slowing down the movement of the movable machine part when a first distance between the object and the hazardous section is fallen below and only stopping it completely when a smaller second distance is fallen below.

Specifically, as part of the safety-related reaction during the (normal) operation of the machine, it is at least provided that the movement (according to the sequence program) of the movable machine part is stopped when the engagement of the object into the protective volume exceeds a defined engagement threshold of the protective volume.

The engagement threshold can be defined in various ways, for example, as a time threshold so that the movement is stopped if an object engages into the protective volume for longer than a certain time period and/or as a distance threshold so that the movement is stopped if an object engaging into the protective volume falls below a certain distance from the hazardous section. In this respect, the distance threshold can generally also be defined in a direction-dependent manner (anisotropic distance threshold) so that the object can approach the hazardous section from different directions at different distances before the movement of the movable machine part is stopped.

A plurality different engagement thresholds can be assigned to the protective volume so that, based on the different engagement thresholds, it can be determined how critical the engagement of a respective object into the protective volume is, and a graduated reaction to the engagement is thus possible.

According to an advantageous embodiment, the safety-related reaction comprises the movement (according to the sequence program) of the movable machine part being slowed down if the engagement exceeds a defined further engagement threshold of the protective volume. In other words, when this further threshold is exceeded, the movement of the movable machine part is (at least initially) continued substantially in accordance with the sequence program, in particular in line with the path, but at a reduced speed compared to the speed according to the sequence program.

Said engagement threshold and the further engagement threshold differ from one another in that the movement of the movable machine part is stopped when said engagement threshold is exceeded and is merely slowed down when the further engagement threshold is exceeded, and also differ by when they are exceeded. The engagement thresholds are expediently defined such that the further engagement threshold is exceeded before said engagement threshold so that the movement is initially only slowed down and only stopped later. In this regard, the further engagement threshold can also be referred to as the first engagement threshold, while said (the other) engagement threshold can be referred to as the second engagement threshold, wherein these designations are not intended to preclude even more further engagement thresholds from being provided on whose exceeding the movement is slowed down to different degrees (compared to the speed according to the sequence program). Said engagement threshold whose exceeding leads to the movement of the movable machine part being stopped is preferably the last to be exceeded and can therefore also be referred to as the last engagement threshold in this regard.

According to the invention, the protective volume is variable, namely depending on the current position of the hazardous section, to allow a scheduled approach of the hazardous section to one or more objects. In other words, the same protective volume (relative to the hazardous section) is not always used for monitoring the environment of the hazardous section, but the protective volume depends on the position at which the hazardous section is currently located along said movement path corresponding to the sequence program. The protective volume is position-dependent in this regard.

For a respective sequence program, the protective volume is therefore expediently not simply defined as a specific spatial volume relative to the hazardous section, but additionally comprises a reference to the respective position along the movement path. In other words, the protective volume defined for a respective sequence program comprises information that allows each position of the hazardous section along the movement path corresponding to the sequence program to be assigned a spatial volume (possibly including respective engagement thresholds) to be used at this position as the respective protective volume monitored for an engagement. This spatial volume can be defined identically for entire sections of the movement path. Due to the position dependency of the protective volume, it is, however, possible (and also expedient for an adaptation to a scheduled approach of the hazardous section to certain objects) that, through the protective volume defined for the respective sequence program, different points or sections of the movement path are assigned different spatial volumes as the respective protective volume to be considered.

In this regard, the term protective volume can be understood differently depending on the context. If it refers to a respective position of the hazardous section along the movement path corresponding to the sequence program, it means the respective spatial volume to be used at this position for monitoring for an engagement; if the term (as with the initial protective volume and the adapted protective volume derived therefrom by teaching-in, which are explained below) refers to the entire sequence program or the entire corresponding movement sequence, it means the entirety of the possibly different spatial volumes that, due to the position dependency, are assigned to a respective point or a respective section of the sequence program or of the movement path as the respective spatial volume (possibly including respective engagement thresholds) to be considered for the monitoring for an engagement.

In this respect, the shape and/or the dimensions (generally the spatial extent) of the protective volume can in particular vary depending on the current position of the hazardous section. Alternatively or additionally thereto, the protective volume can also be variable in that said engagement threshold on whose exceeding the movement of the movable machine part is stopped and/or one or more further engagement thresholds of the protective volume on whose exceeding the safety-related reaction (or one of the individual reactions summarized under it, such as a slowing down of the movement) is triggered, is/are dependent on the current position of the hazardous section.

The one or more objects which the hazardous section should be able to approach as scheduled without triggering the safety-related reaction can, for example, be a workpiece to be machined, a holder or carrier for the workpiece and/or a working surface.

Since the protective volume is variable, the execution of the sequence program can be largely based on a safety volume generally defined with regard to the desired level of safety; however, in portions of the movement of the movable machine part (i.e. in sections of said movement path of the hazardous section) in which the hazardous section approaches one or more objects as scheduled to such an extent that the one or more objects would engage into the protective volume defined in this way and thus trigger the safety-related reaction, it is expedient to assume a protective volume which is adapted to the approach (possibly gradually or continuously) and into which the one or more objects do not engage. The protective volume thus changes in dependence on the position of the hazardous section to achieve the respective highest possible level of safety, on the one hand, but to avoid an unnecessary triggering of the safety-related reaction, on the other hand.

In particular, it is expedient to define the position dependency of the protective volume in relation to the respective sequence program and the resulting movement path of the hazardous section relative to the respective objects. The variable protective volume must therefore first be taught for a sequence program newly predefined for the machine or a change in the objects which the hazardous sections should be able to approach.

According to the invention, the protective volume is taught: in that an initial protective volume is first predefined; in that the machine is controlled so that the movable machine part moves according to the predefined sequence program while the environment of the hazardous section is monitored; in that, if the movement of the movable machine part is stopped as a result of an object engaging into the initial protective volume, a teach-in mode can be started by means of a first user input, in which teach-in mode the movement is continued and position data of objects in the environment of the hazardous section are acquired in the process; in that the teach-in mode can be terminated by means of a second user input; and in that the protective volume (adapted for a scheduled approach to the objects) is defined based on the acquired position data.

In other words, the definition of a protective volume suitable for a scheduled approach to certain objects does not take place upstream of said (normal) operation of the machine (for instance by means of special templates as part of the creation of the sequence program predefined for the machine), but a kind of teach-in operation of the machine is provided that is embedded in said (normal) operation of the machine. The fact that the teaching-in of the protective volume therefore takes place after the definition of the sequence program, and thus independently thereof, enables a particularly intuitive use of the machine and furthermore makes it possible that existing sequence programs can easily be further used.

Thus, no protective volume needs to be considered or defined when creating the sequence program. Rather, the initial protective volume only needs to be predefined immediately before the first run-through of the sequence program in the presence of the objects which the hazardous section should be able to approach so that said teach-in operation can be performed. However, it may be expedient if the initial protective volume is optionally also already at least active for information purposes beforehand (for example via LED indicators), but without a safety-related reaction being triggered by an engagement into the initial protective volume. As a result, the sections of the sequence program in which a safeguarding, adapted to one or more respective objects, of the hazardous section will take place can advantageously already be visible when the sequence program is set up.

For the teaching-in of the protective volume in a type of user-monitored teach-in run, the predefined sequence program, after it has been created, is then initially executed without a safeguarding specifically adapted to an approach, provided within the sequence program, of the hazardous section to the one or more objects. This is because said initial protective volume, which is not specifically adapted to the mentioned approach, but which can, for example, be the mentioned protective volume generally defined with regard to the desired level of security, is in this respect used as the relevant protective volume for the monitoring for an engagement. In particular, the initial protective volume can also be position-independent, i.e. have the same spatial extent (relative to the hazardous section) at every point of the movement path traversed by the hazardous section. However, the initial protective volume can generally also already have a position dependency without being specifically adapted to the mentioned approach, however.

With this initial protective volume, the movable machine part is then moved according to the predefined sequence program. According to the (normal) operation of the machine, the environment of the hazardous section is in this respect monitored for an engagement of any (desired) object into the protective volume, wherein the protective volume is the initial protective volume.

Since the initial protective volume is not adapted to the approach to one or more objects, the one or more objects engage into the initial protective volume during the execution of the sequence program, which, according to the (normal) operation of the machine, leads to the movement of the movable machine part according to the sequence program being stopped as part of the safety-related reaction. According to the invention, it is possible in this situation to start a teach-in mode by means of a first user input. This may include that whenever the movement of the movable machine part is stopped as a result of an object engaging into the respective (i.e. the currently used) protective volume, a user is offered the entry of the first user input, e.g. via a graphical user interface. In such a situation, the user can in particular be prompted to enter the first user input (or selectively another user input). Furthermore, it can be provided that an entry of the first user input is only possible subsequent to a stopping of the movement of the movable machine part as a result of an object engaging into the respective protective volume.

Depending on the situation, the entry of the first user input can also be omitted. This is because if the safety-related reaction (stopping the movement according to the sequence program) was triggered by an object which the hazardous section should not approach at all in accordance with the sequence program, it is expedient to omit the first user input and thus not to start the teach-in mode.

The designation of the first user input as the first user input in this respect merely serves to conceptually differentiate between different user inputs and is not to be understood as an indication of a specific number of user inputs or as an indication of a specific sequence or hierarchy between different user inputs. The same accordingly applies to further user inputs mentioned below.

The teach-in mode possibly started by the first user input differs from the (normal) operation of the machine in particular in that the movement of the movable machine part according to the sequence program is continued despite the engagement into the protective volume that led to the movement being stopped, even if the engagement continues. In this regard, the safeguarding of the hazardous section by monitoring the environment of the hazardous section and, if necessary, triggering the safety-related reaction in the teach-in mode is virtually suspended. A further peculiarity of the teach-in mode is that, while the movement of the movable machine part is continued in accordance with the sequence program, position data of objects in the monitored environment of the hazardous section are acquired. These objects can then in particular be the one or more objects which the hazardous section should be able to approach as scheduled without triggering the safety-related reaction. In this respect, the position data can in particular be acquired by means of the same sensors that are also used outside the teach-in mode for monitoring the environment of the hazardous section.

Finally, the teach-in mode can be terminated by means of a second user input. The termination of the teach-in mode in particular results in the machine again being operated in the normal manner in accordance with the predefined sequence program, in particular such that the movement of the movable machine part, if it has not yet been completed, is continued in a manner according to the sequence program. The position data acquired in the teach-in mode are then used as the basis (namely as said reference data) for adapting the protective volume at least in that portion of the movement of the movable machine part (or of the movement path of the hazardous section) that was traveled in the teach-in mode. For, based on the acquired position data, it can be determined which maximum spatial extent the protective volume may have depending on the current position of the hazardous section without the objects whose position data were acquired engaging into the protective volume. This makes it possible to optimally adapt the protective volume to the approach to the objects that is provided in accordance with the sequence program. However, in the remaining portions of the movement of the movable machine part (or of the movement path of the hazardous section), the initial protective volume can easily be maintained, for example.

The teaching-in according to the invention of the protective volume can be performed comparatively easily since it does not need to be performed beforehand separately from the actual implementation of the sequence program and also does not require any modification of the sequence program. The implementation of a specific sequence program template is thus in particular omitted. Instead, the teaching-in can be started exactly when it is required (possibly for the first time or also again) and then takes place embedded in the sequence program. The configuration of the machine for a respective application can thereby be simplified and shortened overall.

According to an advantageous embodiment, in the teach-in mode, the movement of the movable machine part is continued in a risk-reduced manner. The risk reduction can result from changed movement parameters of the movement of the movable machine part that can otherwise take place according to the sequence program. In particular, the movement can be continued in the teach-in mode at a reduced speed compared to a speed according to the predefined sequence program. The movement is in this respect preferably continued in line with the path, in particular so that the hazardous section moves along the same movement path which corresponds to the sequence program and along which it would also move without an object engaging into the protective volume and the teach-in mode being started.

Starting the teach-in mode temporarily suspends the safety function, according to which a safety-related reaction is triggered on an engagement into the protective volume. The fact that the further movement is continued in the teach-in mode in a risk-reduced manner or at a reduced speed makes it possible to carry out the approach provided as scheduled to one or more objects under controlled conditions and thus with a comparatively low risk of danger despite the suspended safety function. This contributes significantly to the teaching-in of a protective volume adapted to the scheduled approach being able to be embedded in the (normal) operation of the machine and not having to take place beforehand as part of a separate teach-in procedure.

According to a further advantageous embodiment, for those portions of the movement (according to the sequence program) of the movable machine part in which the objects, whose position data were acquired in the teach-in mode, engage into the initial protective volume, the protective volume is defined by reducing the initial protective volume until these objects no longer engage into it. For the remaining portions of the movement, the protective volume can simply be equated with the initial protective volume or the initial protective volume can be maintained.

In this embodiment, the adapted protective volume is based on the initial protective volume whose spatial extent is reduced for each point of the movement path of the hazardous section in each case until none of the objects engage into the protective volume. In this respect, it can be expedient to provide a certain safety distance, i.e. to reduce the protective volume by this safety distance further than is at least necessary. The reduction of the protective volume can take place in a graduated manner so that the respective portion of the movement can have one or more subsections within which the protective volume is uniformly defined in each case. However, the protective volume can also be defined continuously so that it is generally individually defined for each point of the respective section.

The protective volume can be reduced to different degrees in different spatial directions to also adapt the protective volume in terms of its shape as ideally as possible to the respective objects. Ideally, the adapted protective volume, as a result, in each case reaches at least substantially up to a respective one of the objects (in particular up to said safety distance). The reduction of the protective volume can also comprise adapting said engagement threshold and, if necessary, further engagement thresholds of the protective volume that can shift according to the reduction, in particular can approach the hazardous section.

According to a further advantageous embodiment, in the teach-in mode, the movement (possibly continued in a risk-reduced manner) of the movable machine part is stopped as soon as no object engages into the initial protective volume; subsequently; the teach-in mode can then be terminated by means of the second user input. As soon as the monitoring of the environment of the hazardous section determines that no object engages into the initial protective volume, it is therefore possible to terminate the teach-in mode. In particular, it can be provided that a user is prompted to enter the second user input in this situation in order to acknowledge and thus finalize the teaching-in of the protective volume adapted to the scheduled approach. The second user input for terminating the teach-in mode is preferably only possible at all if no object engages into the initial protective volume.

However, the teach-in mode does not necessarily have to be terminated by means of the second user input after the movement of the movable machine part has been stopped since no object engages into the initial protective volume. Rather, it can be provided that the teach-in mode can selectively be continued, for instance by means of a fourth user input. The user can in particular be prompted to selectively enter the second or the fourth user input. Continuing the teach-in mode can, for example, be sensible if a direct further engagement into the initial protective volume can be assumed based on knowledge of the sequence program. If the teach-in mode is continued, it is therefore expedient if a further engagement of an object into the initial protective volume is not reacted to in a particular manner (in particular the movement of the movable machine part is not stopped in this case and the user is not prompted to enter the first user input either) since the teach-in mode has already started. However, if the teach-in mode is continued after a further engagement of an object into the initial protective volume, the movement of the movable machine part is advantageously stopped again as soon as no object engages into the initial protective volume; subsequently, the teach-in mode can then be selectively terminated or continued again (by means of the second or fourth user input).

According to a further advantageous embodiment, the movement of the movable machine part is continued in accordance with the sequence program after the termination of the teach-in mode. If the movement of the movable machine part has been continued in a risk-reduced manner in the teach-in mode, it is preferably again continued in a non-risk-reduced manner after the termination of the teach-in mode, in particular again at the same speed as before the teach-in mode was started. The type of operation of the machine before the teach-in mode (before the first user input) and the type of operation of the machine after the teach-in mode (after the second user input) preferably differ from one another at most in that the environment of the hazardous section is monitored with respect to a different protective volume after the teaching-in (namely with respect to the protective volume adapted by the teaching-in to the scheduled approach to one or more objects) than before the teaching-in.

According to a further advantageous embodiment, if the first user input is absent (and the teach-in mode is therefore not started) after the movement of the movable machine part has been stopped as a result of an object engaging into the protective volume, the movement of the movable machine part is not continued as long as the object engages into the protective volume. For the object that caused the movement to stop does not necessarily have to be an object which the hazardous section should be able to approach, but can also be an object that interferes with the movement of the movable machine part and/or can be endangered by the hazardous section. The first user input can confirm that it is an object that should be approachable; however, if the first user input is absent, it can be assumed that it is an interfering or endangered object so that the safety-related reaction of stopping the movement is maintained, preferably at least as long as the object still engages into the protective volume. Even afterwards (when the object no longer engages into the protective volume) the movement is not necessarily continued directly. Instead, it can be provided to wait for a certain time period during which no further engagement takes place and/or that the continuation of the movement requires a third user input by which the continuation is enabled.

According to a further advantageous embodiment, if the movement of the movable machine part is stopped as a result of an object engaging into the current or initial protective volume, a user of the machine is prompted to selectively enter the first user input or a third user input (the one mentioned above) by means of which a continuation of the movement of the movable machine part is enabled in accordance with the sequence program (with movement parameters according to the sequence program, in particular at a speed according to the sequence program). If the third user input is entered, the movement does not necessarily have to be continued directly. In particular, an additional prerequisite for continuing the movement may (according to the above embodiment) be that no object engages into the protective volume and, if necessary, that furthermore a certain time period has elapsed since the last engagement.

According to an advantageous embodiment, the environment of the hazardous section is monitored by means of one or more sensors, in particular one or more non-contact distance sensors. The monitoring comprises detecting an engagement into the protective volume. The protective volume is in this respect expediently spanned by the one or more sensors. The sensors are preferably moved along with the movable machine part, for example by being arranged within the hazardous section or adjacent thereto at the movable machine part. The sensors can in particular be arranged in a ring shape or otherwise arranged rotationally symmetrically. The shape of the protective volume can then result from the arrangement and the orientation of the sensors, in particular from the respective angle of engagement, of the sensors, possibly in conjunction with distance thresholds.

Sensors that generate a single distance value or multiple sensors that generate distance values of a plurality of adjacent measurement points can be used as distance sensors. The measurement principle according to which the sensors function can be an optical measurement principle, an acoustic measurement principle (e.g. using ultrasound) or an electromagnetic measurement principle (e.g. using RADAR). In the case of an optical measurement principle, so-called SPAD (single-photon avalanche diodes) can in particular be used as sensors.

Said position data are preferably acquired by means of the one or at least one of the plurality of sensors, i.e. by means of the same one sensor or by means of at least one of the same plurality of sensors (possibly by means of exactly the same plurality of sensors) by means of which the environment of the hazardous section is also monitored. However, this is not necessarily the case. Sensors other than those used for the monitoring can generally also be used to acquire the position data.

According to a further advantageous embodiment, the sequence program is independent of the protective volume. This in particular means that the sequence program can be compiled without considering the protective volume (whether it is an initial protective volume or a protective volume that has already been suitably adapted) and can be predefined for the machine. When programming the sequence program, it is thus not yet necessary to define a final protective volume, nor does a teaching-in of a protective volume, for instance using a dedicated template, have to be provided.

In particular, it is further preferred that the sequence program is not modified by the teaching-in of the protective volume. For example, there is no need to insert a specific safeguarded waypoint into the sequence program that has to be approached so that reference data for defining the protective volume can be acquired from there in a program block specifically provided for this purpose. The sequence program is not changed otherwise either-neither for the teaching-in nor as a result of the teaching-in of the protective volume. It may be temporarily executed in a risk-reduced manner in the teach-in mode under certain circumstances, but it is maintained overall and reused unchanged subsequent to the teach-in mode.

However, it can also be provided that the movement of the movable machine part in those sections of the sequence program in which the protective volume was adapted by the teaching-in described to objects which the hazardous section should be able to approach is also performed in a risk-reduced manner, in particular at a reduced speed. For this purpose, the sequence program, however, does not necessarily have to be modified, but it can be sufficient if the machine is controlled such that the predefined sequence program is executed in a risk-reduced manner in said sections (similar to the teach-in mode). The risk reduction can in this respect be less than in the teach-in mode; the speed can in particular be reduced less than in the teach-in mode.

According to a further advantageous embodiment, the protective volume can be adapted for a scheduled approach to changed objects by repeating the teaching-in described, wherein the last taught protective volume is then predefined as the initial protective volume during the repeated teaching-in. The changed objects are in particular changed compared to those objects whose position data were acquired during the previous teaching-in of the protective volume. In this respect, the changed objects can in particular have changed insofar as the number of objects, their position in space and/or their arrangement relative to one another have changed and/or one or more of the objects have been replaced by other objects. In principle, any change can be considered that makes it necessary to adapt the protective volume (again) to allow a scheduled approach to the objects, but to simultaneously maintain the safeguarding of the hazardous section as far as possible by monitoring its environment.

One advantage of the method according to the invention is that a repeated adaptation (even if multiple times) of the protective volume to changed conditions essentially requires no special measures. Rather, as part of the method described, the possibility of a further teaching-in of the protective volume can arise automatically by one of the objects engaging into the current (last taught) protective volume due to the change in the objects, whereupon the teach-in mode can then be started by means of the first user input. The teaching-in of the newly adapted protective volume then takes place in the same way as the previous performed teaching-in. If the change in the objects has the result that the protective volume can be increased again overall, it can also be expedient for the adaptation of the protective volume to changed objects to first reset the protective volume before the repeated teaching-in, for example to an original initial protective volume (used for the first teaching-in).

The machine according to the invention has a movable machine part comprising a hazardous section. The machine further comprises a control apparatus that is configured for a safe operation of the machine according to any one of the above-described methods. The machine, the movable machine part and the hazardous section can in this respect each in particular be configured in one of the ways described above.

That the control apparatus is configured for a safe operation of the machine, can in particular comprise that it is configured: to control the movable machine part to move according to a sequence program predefined for the control apparatus; and to monitor an environment of the hazardous section and, in the event of an engagement of an object into a defined protective volume within the monitored environment, to trigger a safety-related reaction that comprises stopping the movement of the movable machine part if the engagement exceeds a defined engagement threshold of the protective volume, wherein the protective volume is variable, namely depending on the current position of the hazardous section, to allow a scheduled approach of the hazardous section to one or more objects. In particular, the control apparatus is (further) configured to teach-in the protective volume according to any one of the above-described methods. The advantages of the respective method then correspondingly also result for the machine.

According to an advantageous embodiment, the machine further has one or more sensors, in particular one or more non-contact distance sensors, that are moved along with the movable machine part, wherein the control apparatus is configured to control the one or more sensors to monitor the environment of the hazardous section. For this purpose, the control apparatus can, for example, control the one or more sensors to take measurements within the environment of the hazardous section and can then evaluate the measurement values resulting from the measurements with regard to whether or not an object engages into the protective volume. In the event of an engagement into the protective volume, the control apparatus can control the movable machine part to interrupt the movement according to the sequence program.

According to a further advantageous embodiment, the control apparatus is configured to control the one or at least one of the plurality of sensors to acquire the position data of the respective objects in the teach-in mode. The control apparatus can then use the position data to newly define the protective volume, namely adapted to a scheduled approach of the hazardous section to the objects whose position data have been acquired.

The invention will be explained further in the following only by way of example with reference to the Figures.

Figure 1:
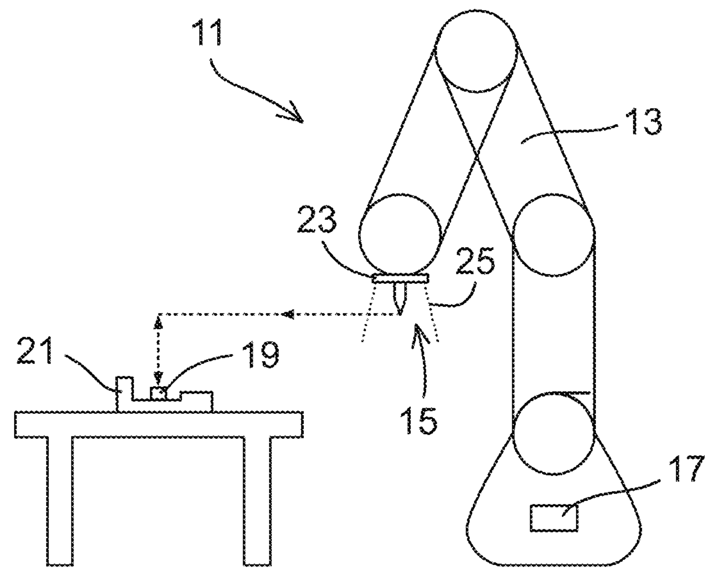
FIG. 1 shows a machine according to the invention in accordance with an exemplary embodiment in a schematic representation.
Figure 2:
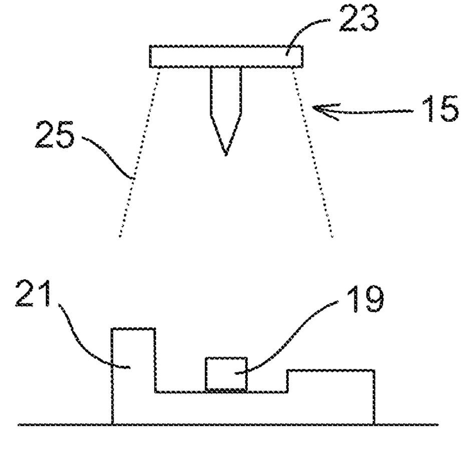
FIGS. 2 to 5 show different states of the machine during a teaching-in of a protective volume in enlarged sectional representations.
Figure 3:
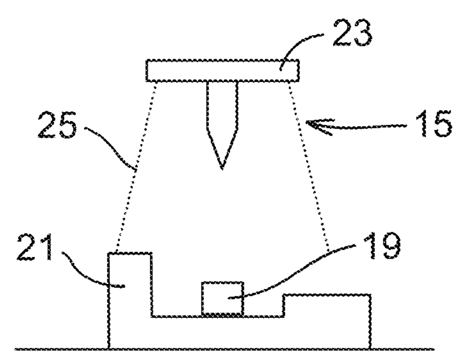
Figure 4:
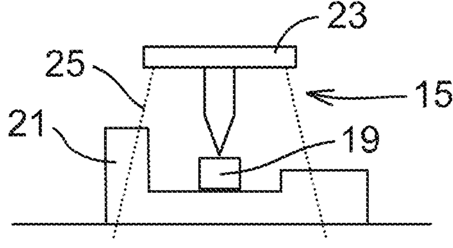

The exemplary embodiment of a machine 11 according to the invention shown in FIG. 1 is a robot that has a movable machine part 13 in the form of a robot arm. At the distal, free end of the movable machine part 13, the machine 11 has a tool mount with a tool that, due to its structure (sharp-edged, pointed) and its function, poses a hazard to a human (not shown) working together with the machine 11. In this regard, the tool mount with the tool represents a hazardous section 15 of the movable machine part 13.

The machine 11 further has a control apparatus 17 that is configured to operate the machine, namely in particular to move the movable machine part 13 according to a sequence program predefined for the control apparatus 17 of the machine 11. Due to this movement of the movable machine part 13, the hazardous section 15 of the movable machine part 13 moves along a movement path corresponding to the sequence program. An example of at least a part of such a movement path is shown in FIG. 1 in the form of a dashed line that is shown in relation to a tool tip of said tool as a representative point for the entire hazardous section 15.

As illustrated by the arrow tips along the movement path, the hazardous section 15, in accordance with the exemplary sequence program, first moves horizontally to above an object 19 which is a workpiece that is arranged at a further object 21 which is workpiece holder resting on a working surface; from there, the hazardous section 15 moves vertically towards the object 19 until the tool tip is in contact with the object 19, for example to process the workpiece; and finally moves vertically away from the object 19 again. Subsequently, the hazardous section 15 can again also move horizontally back into the starting position shown in FIG. 1. In FIGS. 2 to 5, the hazardous section 15 and the objects 19, 21 are shown in enlarged sectional representations for various states of said vertical movement of the hazardous section 15.

The machine 11 further has a plurality of sensors 23, namely non-contact distance sensors, in the form of a ring-shaped sensor arrangement that is arranged at the distal end of the movable machine part 13 and that surrounds the hazardous section 15. In this respect, the sensors 23 are arranged such that they can be controlled by the control apparatus 17 to monitor an environment of the hazardous section 15. Due to their arrangement and orientation, the sensors 23 can detect distances of objects relative to the respective sensor 23 along a measurement range that substantially has the shape of a truncated cone in the exemplary embodiment.

By limiting this measurement range to a certain maximum distance from the sensors 23, a protective volume 25 is defined that has the shape of a lampshade. The protective volume 25 is illustrated by dotted lines in FIGS. 1 to 5. Said maximum distance can in this respect correspond to a defined engagement threshold of the protective volume 25.

In the interaction of the control apparatus 17, on the one hand, with the movable machine part 13 and, on the other hand, with the sensors 23, the machine 11 can be safely operated for the protection of a person working together with the machine 11. For this purpose, the protective volume 25 is monitored by means of the sensors 23 and a safety-related reaction is triggered in the event of an engagement of an object into the protective volume 25. Specifically, in the exemplary embodiment, the movement of the movable machine part 13 according to the sequence program is stopped as soon as it is determined by the sensors 23 that said engagement threshold of the protective volume 25 has been exceeded, i.e. that an object has approached the hazardous section 15 up to a distance that is smaller than said maximum distance. The movement of the movable machine part 13 is thereby immediately stopped as soon as any object, for example a body part (such as a hand) of said person, comes too close to the hazardous section 15. The risk of an accident is thereby substantially reduced.

However, the safety-related reaction is also triggered when the hazardous section 15 approaches the object 19 as scheduled, i.e. according to the predefined sequence program (cf. the sequence of FIGS. 2 to 4), since the objects 19, 21 in this respect engage into the protective volume 25 (cf. FIG. 4) if the same protective volume 25 is used throughout. It is therefore expedient to define the protective volume 25 for the scheduled approach of the hazardous section 15 to the objects 19, 21 in dependence on its position along said movement sequence, and to adapt the protective volume 25 for positions in the vicinity of the objects 19, 21 such that they do not (or no longer) trigger the safety-related reaction. When the hazardous section 15 approaches a specific arrangement of objects 19, 21 for the first time, the protective volume 25 therefore first has to be taught-in accordingly, i.e. adapted to this specific arrangement.

Figure 5:
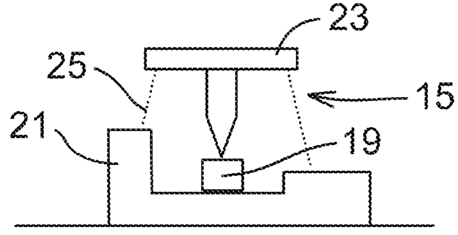

Such an adaptation can, for example, consist of suitably reducing the maximum distance from the sensors 23 to which the protective volume 25 is limited (and thus also said engagement threshold) at least for the portion of the movement in which the hazardous section 15 is located in the vicinity of the objects 19, 21. An example of an adapted protective volume 25 is shown in FIG. 5, in which it can also be seen that the adaptation (here: the reduction of the maximum distance from the sensors 23) can be orientation-dependent (more on the left than on the right) so that the protective volume 25 can be adapted to a correspondingly irregular structure of the objects 19, 21.

The adaptation of the protective volume 25 can in this respect also depend on the position of the hazardous section 15 along its movement path. In FIG. 5, the hazardous section 15 is just at the reversal point of its vertical movement towards or away from the object 19 at which said maximum distance mentioned must be reduced the most to adapt the protective volume 25. In positions between the position shown in FIG. 3, in which the object 21 just minimally engages into the protective volume 25, and the position of the hazardous section 15 shown in FIG. 5, the maximum distance can be reduced to a lesser extent in comparison thereto. For example, the adapted protective volume 25 can be continuously adapted to the objects 19, 21 depending on the respective position of the hazardous section 15. However, the adaptation can also be graduated up to the point that the protective volume 25 is defined along the entire section of the movement path from the position shown in FIG. 3, via the position shown in FIG. 5, back into the position shown in FIG. 3 in the manner illustrated in FIG. 5.

Figure 6:
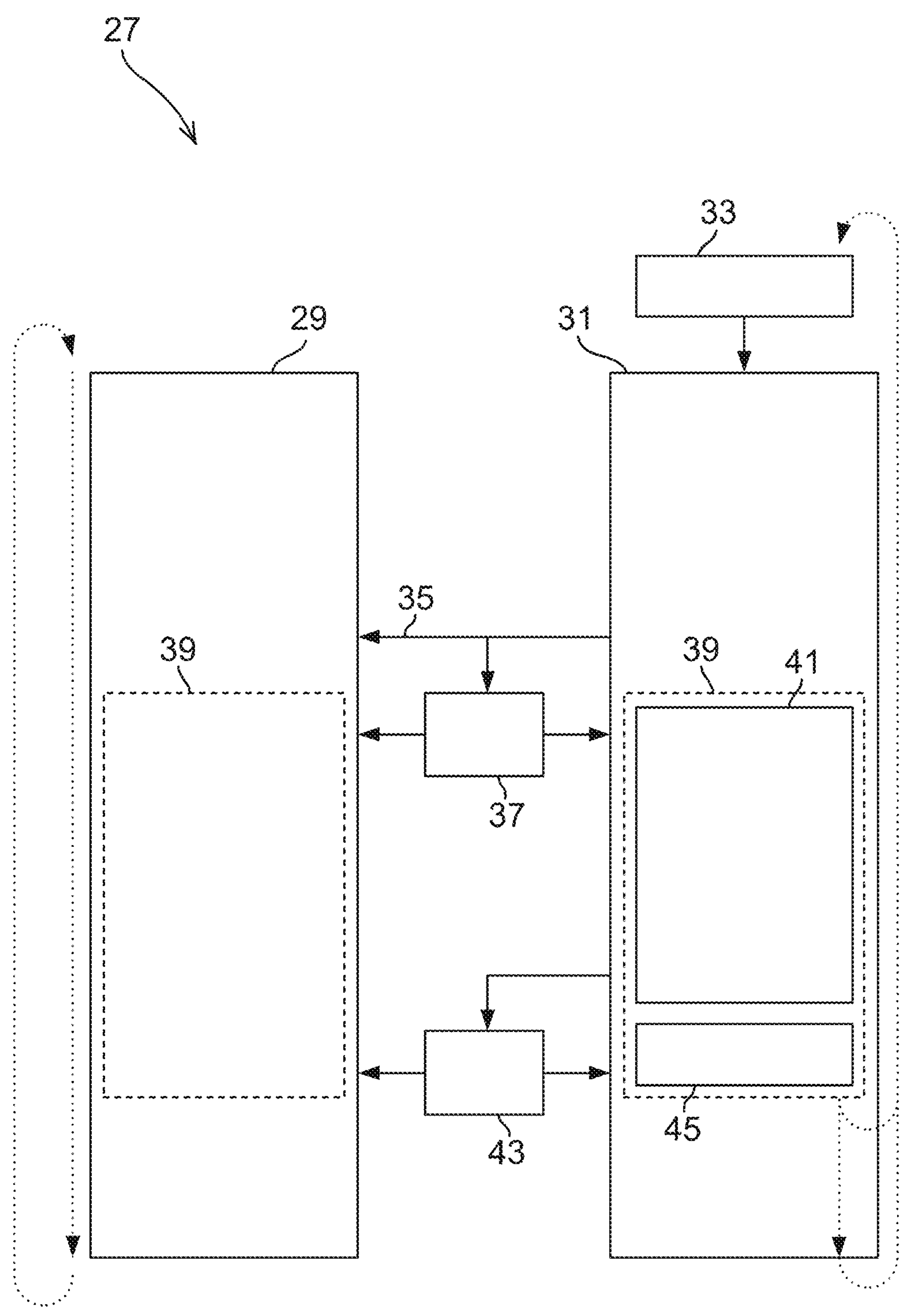
FIG. 6 shows a schematic visualization of an exemplary embodiment of the method according to the invention.

The teaching-in of the protective volume 25 for an adaptation to specific objects 19, 21 can take place in accordance with the visualization shown in FIG. 6 of an exemplary embodiment of the method 27 according to the invention for the safe operation of a machine 11. The method 27 comprises a block 29 in which the movable machine part 13 moves according to a sequence program predefined for the machine 11. The run-through of the sequence program is symbolized in FIG. 6 by a dotted arrow (left) that extends vertically along the block 29; it is symbolized by a further dotted arrow, which connects the end of said arrow with its beginning so that the two arrows form a loop, that the sequence program can be run through multiple times.

Parallel to the movement of the movable machine part 13 according to the sequence program in the block 29, the environment of the hazardous section 15 is continuously monitored in a block 31. In this respect, it is monitored by the sensors 23 whether any object enters the respective protective volume 25 within the environment of the hazardous section 15. An initial protective volume, which is, for example, the protective volume illustrated in FIGS. 1 to 4, is initially predefined as the protective volume 25 by the block 33. In the event of an object engaging into the protective volume 25 (for example in the position of the hazardous section 15 shown in FIG. 3), a safety-related reaction is triggered that comprises stopping the movement of the movable machine part 13 if the engagement exceeds said engagement threshold of the protective volume 25. The stopping of the movement as part of the safety-related reaction is symbolized by an arrow 35. The procedure corresponds to the normal operation of the machine 11 in this respect.

If the object that engaged into the protective volume 25 is one of the objects 19, 21 which the hazardous section 15 should be able to approach as scheduled, the protective volume 25 must be adapted for this scheduled approach. For this purpose, after the movement of the movable machine part 13 has been stopped, a user can enter a first user input in the block 37 and can thereby start a teach-in mode 39 that affects both the movement of the movable machine part 13 in accordance with the sequence program in the block 29 and the monitoring of the environment of the hazardous section 15 in the block 31. In this teach-in mode 39, on the one hand, the movement of the movable machine part 13 is continued, but (in the present exemplary embodiment) in a risk-reduced manner, namely at a reduced speed. On the other hand, in the teach-in mode 39, position data of the objects 19, 21 are acquired by means of the sensors 23 in the block 41.

If the hazardous section 15 has again moved so far away from the objects 19, 21 along its movement path according to the sequence program that they no longer engage into the protective volume 25, a user can enter a second user input in the block 43 and can thereby terminate the teach-in mode 39. In the block 45, a protective volume 25 adapted in a position-dependent manner is then defined as the end of the teach-in mode 39 based on the acquired position data of the objects 19, 21. As a rule, it results that the adapted protective volume 25 only differs from the initial protective volume in the section of the sequence program between the first user input and the second user input and is identical to the initial protective volume in the other sections of the sequence program. After the termination of the teach-in mode 39, the movement of the movable machine part 13 according to the sequence plan is again continued in a non-risk-reduced manner, i.e. again at the speed provided according to sequence plan, in the block 29.

During the continuation of the movement according to the sequence plan, the protective volume 25 adapted in a position-dependent manner can then already be used for the likewise continued monitoring of the environment of the hazardous section 15, which is symbolized in FIG. 6 by a vertical dotted arrow (bottom right), wherein, however, the adapted protective volume 25 can (as mentioned above) be identical to the initial protective volume in this section of the sequence program. At the latest when the sequence program is run again (block 29), the protective volume 25 defined in the block 45 is then used for monitoring the environment of the hazardous section 15 and, for this purpose, is predefined as a new position-dependent protective volume 25 for the block 31 in the block 33 (cf. the further dotted arrow at the right that leads back to the block 33). In sections of the sequence program in which the hazardous section 15 is far away from the objects 19, 21 and the protective volume 25 therefore has not been adapted, this new protective volume 25 does not differ from the original initial protective volume. However, in such sections in which a scheduled approach to the objects 19, 21 is intended and would lead to the objects 19, 21 engaging into the original initial protective volume, the new protective volume 25, in accordance with its position dependency, is adapted relative to the original initial protective volume such that the objects 19, 21 do not engage into the protective volume 25.

The method 27 can then continue ever further with the new protective volume 25. If one or more objects which the hazardous section 15 should be able to approach in this respect engage into the respective protective volume 25 again (for example due to a changed arrangement of the objects 19, 21 or another change to the objects 19, 21), the teach-in mode 39 can be started again by the first user input, position data of the respective objects can be acquired and a newly adapted protective volume 25 can be defined based on the acquired position data. In this regard, the new protective volume 25, which is defined in the block 45 and which, during the respective subsequent run-through of the sequence program, is predefined for the block 31 in the block 33, can be regarded as a new initial protective volume for this subsequent run-through that is position-dependent and that differs from the original initial protective volume only in the section of the approach to the objects 19, 21.

The particular simplicity of the method 27 in particular results from the fact that the teaching-in does not have to be specifically scheduled, for example incorporated into the sequence program at a certain point thereof or provided therein from the outset, but is always automatically possible whenever it is necessary for the first time after a change to the conditions to adapt the protective volume 25 thereto. For this purpose, the user only has to confirm by means of the first user input that the stopping of the movement according to the sequence program was triggered by an object to which an approach should be possible and that the teach-in mode 39 should therefore be started, and finally has to confirm by means of the second user input that the protective volume should be redefined, namely based on the position data of the respective objects that were acquired during the teach-in mode 39. A safe operation of the machine can thus be achieved in a particularly simple and comfortable manner.

REFERENCE NUMERALS

11 machine
13 movable machine part
15 hazardous section
17 control apparatus
19, 21 object
23 sensors
25 protective volume
27 method for the safe operation of a machine
29-37 blocks/arrows for visualizing method sequences
39 teach-in mode
41-45 blocks for visualizing method sequences

The invention claimed is:

1. A method for the safe operation of a machine that has a movable machine part comprising a hazardous section,
wherein the method comprises:
the movable machine part moving according to a sequence program predefined for the machine; and
an environment of the hazardous section being monitored,
wherein, in the event of an engagement of an object into a defined protective volume within the monitored environment, a safety-related reaction is triggered that comprises the movement of the movable machine part being stopped if the engagement exceeds a defined engagement threshold of the protective volume;
wherein the protective volume is variable, namely depending on the current position of the hazardous section, to permit a scheduled approach of the hazardous section to one or more objects, and
wherein the protective volume is taught:
in that an initial protective volume is first predefined;
in that the machine is controlled so that the movable machine part moves according to the predefined sequence program while the environment of the hazardous section is monitored;
in that, if the movement of the movable machine part is stopped as a result of an object engaging into the initial protective volume, a teach-in mode can be started by means of a first user input, in which teach-in mode the movement is continued and position data of objects in the environment of the hazardous section are acquired in so doing;
in that the teach-in mode can be terminated by means of a second user input; and
in that the protective volume is defined based on the acquired position data,
wherein, in the teach-in mode, the movement of the movable machine part is stopped as soon as no object engages into the initial protective volume anymore and the teach-in mode can then be terminated by means of the second user input.

2. The method according to claim 1, wherein the machine is part of a human-robot collaboration.

3. The method according to claim 1,
wherein the safety-related reaction comprises the movement of the movable machine part being slowed down if the engagement exceeds a defined further engagement threshold of the protective volume.

4. The method according to claim 3, wherein the engagement thresholds are defined such that the further engagement threshold is exceeded before said engagement threshold.

5. The method according to claim 1,
wherein, in the teach-in mode, the movement of the movable machine part is continued in a risk-reduced manner.

6. The method according to claim 5,
wherein the movement of the movable machine part is continued at a reduced speed compared to a speed corresponding to the predefined sequence program.

7. The method according to claim 1,
wherein, for those portions of the movement of the movable machine part in which the objects, whose position data were acquired, engage into the initial protective volume, the protective volume is defined by reducing the initial protective volume until these objects no longer engage into it.

8. The method according to claim 7,
wherein the protective volume is equated with the initial protective volume for the remaining portions of the movement.

9. The method according to claim 1,
wherein the movement of the movable machine part is continued in accordance with the sequence program after the termination of the teach-in mode.

10. The method according to claim 1,
wherein, if the first user input is absent after the movement of the movable machine part has been stopped as a result of an object engaging into the protective volume, the movement of the movable machine part is not continued as long as the object engages into the protective volume.

11. The method according to claim 1,
wherein, if the movement of the movable machine part is stopped as a result of an object engaging into the initial protective volume, a user of the machine is prompted to selectively enter the first user input or a third user input by means of which a continuation of the movement of the movable machine part is enabled in accordance with the sequence program.

12. The method according to claim 1,
wherein the environment of the hazardous section is monitored by means of one or more sensors that are moved along with the movable machine part.

13. The method according to claim 12,
wherein the one or more sensors are one or more non-contact distance sensors.

14. The method according to claim 12,
wherein the position data are acquired by means of the one or at least one of the plurality of sensors.

15. The method according to claim 1,
wherein the sequence program is independent of the protective volume.

16. The method according to claim 15,
wherein the sequence program is not modified by the teaching-in of the protective volume.

17. The method according to claim 1,
wherein the protective volume can be adapted for a scheduled approach to changed objects by repeating the teaching-in, wherein the last taught protective volume is predefined as the initial protective volume during the repeated teaching-in.

18. A machine that has a movable machine part comprising a hazardous section and comprises a control apparatus that is configured to carry out a method for a safe operation of the machine, wherein the method comprises:

the movable machine part moving according to a sequence program predefined for the machine; and an environment of the hazardous section being monitored, wherein, in the event of an engagement of an object into a defined protective volume within the monitored environment, a safety-related reaction is triggered that comprises the movement of the movable machine part being stopped if the engagement exceeds a defined engagement threshold of the protective volume;

wherein the protective volume is variable, namely depending on the current position of the hazardous section, to permit a scheduled approach of the hazardous section to one or more objects, and wherein the protective volume is taught:

in that an initial protective volume is first predefined;

in that the machine is controlled so that the movable machine part moves according to the predefined sequence program while the environment of the hazardous section is monitored;

in that, if the movement of the movable machine part is stopped as a result of an object engaging into the initial protective volume, a teach-in mode can be started by means of a first user input, in which teach-in mode the movement is continued and position data of objects in the environment of the hazardous section are acquired in so doing;

in that the teach-in mode can be terminated by means of a second user input; and in that the protective volume is defined based on the acquired position data, wherein, in the teach-in mode, the movement of the movable machine part is stopped as soon as no object engages into the initial protective volume anymore and the teach-in mode can then be terminated by means of the second user input.

19. The machine according to claim 18 that further has one or more sensors that are moved along with the movable machine part, wherein the control apparatus is configured to control the one or more sensors to monitor the environment of the hazardous section.

20. The machine according to claim 19 wherein the one or more sensors are one or more non-contact distance sensors.

21. The machine according to claim 19, wherein the control apparatus is configured to control the one or at least one of the plurality of sensors to acquire the position data in the teach-in mode.

* * * * *